United States Patent [19]

Semon

[11] 4,015,816
[45] Apr. 5, 1977

[54] ROTARY PLUG VALVE

[76] Inventor: Albert L. Semon, 11 Eliot Place, Short Hills, N.J. 07078

[22] Filed: Apr. 24, 1975

[21] Appl. No.: 571,085

[52] U.S. Cl. .............................. 251/285; 251/288; 251/317; 251/368; 251/309; 251/192
[51] Int. Cl.² ........................................ F16K 51/00
[58] Field of Search .......... 251/285, 288, 192, 309, 251/286, 368, 314–317; 277/DIG. 6

[56] References Cited

UNITED STATES PATENTS

| | | | |
|---|---|---|---|
| 2,433,732 | 12/1947 | Brown | 251/309 |
| 3,254,872 | 6/1966 | Roos | 251/317 |
| 3,343,802 | 9/1967 | Schuilwerve | 251/309 |
| 3,360,236 | 12/1967 | Hulslander | 251/309 |
| 3,787,028 | 1/1974 | Semon | 251/317 |

OTHER PUBLICATIONS

E.L. Carlotta, "Synthetic Rubber O-Ring Seals", Product Engineering Magazine, June, 1951, pp. 130–135.

Primary Examiner—William R. Cline
Assistant Examiner—H. Jay Spiegel
Attorney, Agent, or Firm—Edward R. Weingram

[57] ABSTRACT

A rotary plug valve in which the plug has a special sealing means in its outer surface to contact the wall of the plug chamber in encircling relation to the inlet flow port of the valve body when the plug is in closed position, said sealing means including a generally circular disk having limited inherent resiliency seated in a recess in the plug and provided with a generally circular rib on its front side to encircle said flow port in sealing contact with the wall of the plug chamber. One form of disk also has a circular rib on its rear side to contact the bottom wall of said recess. An arcuate wire stop element coactive with a knob on the valve plug and having end portions insertable into recesses in the valve body is provided for stopping rotation of the plug selectively in different positions.

14 Claims, 12 Drawing Figures

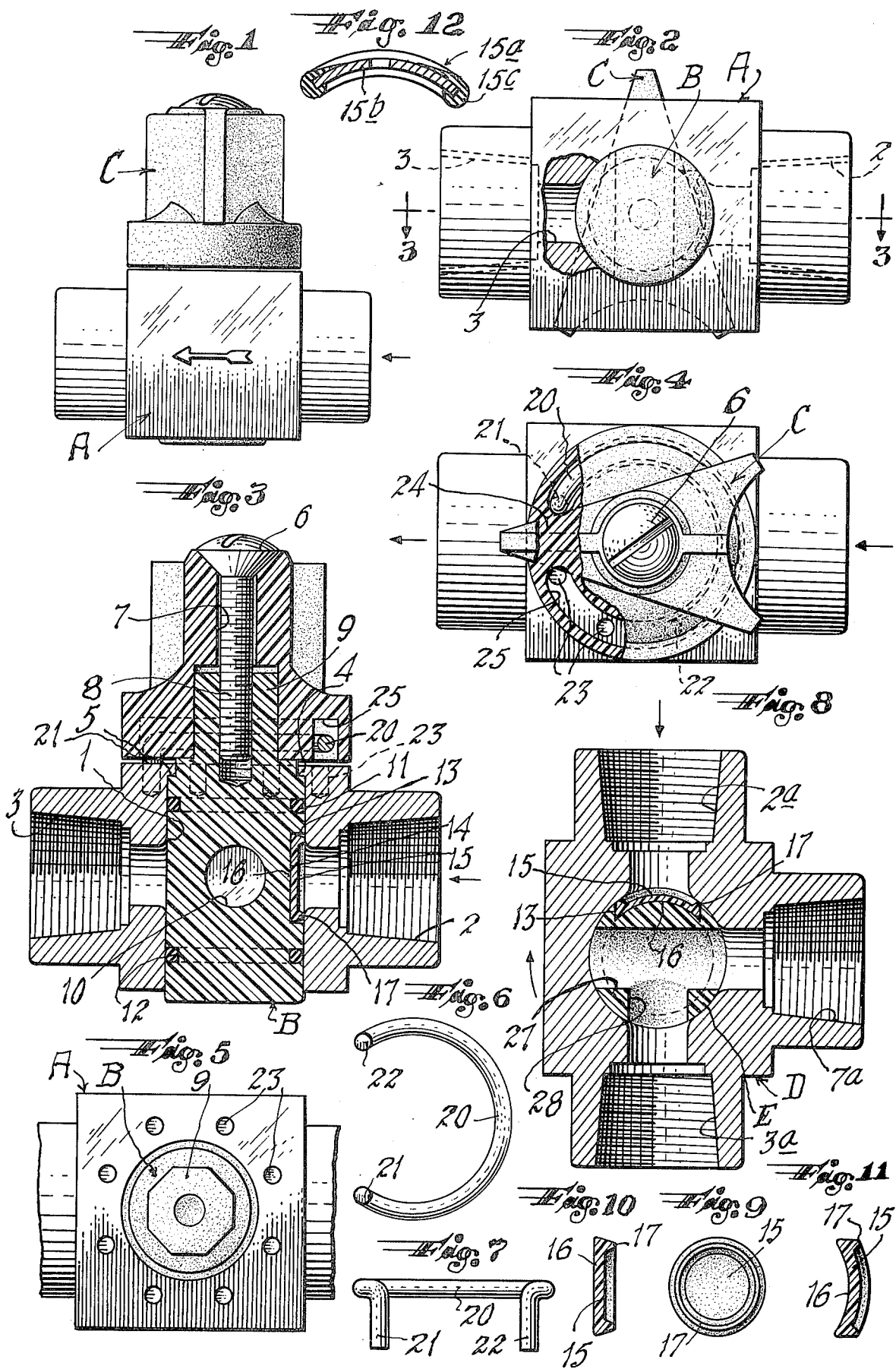

ROTARY PLUG VALVE

BACKGROUND OF THE INVENTION

This invention relates to valves of the rotary plug type and more particularly concerns a valve which has a metal body with inlet and outlet ports and a plug chamber comprising an opening extending through said body in perpendicular relation to said ports, a valve plug rotatably mounted in said chamber having a transverse passage selectively to move into and out of register with said port holes upon rotation of the plug, and means including a knob on one end of the plug coactive with the valve body for separably holding said plug in operative position in the valve body.

Valves of this general nature are widely known in the prior art, as shown for example, by U.S. Pat. Nos. 3,223,111; 3,173,648; 2,982,148, and my U.S. patent No. 3,787,028. These and other prior art valves provide so-called leak-proof means to reduce the possibility of leakage of fluid between the ports in the valve body and the rotary plug but such means either do not provide certainty of no leakage, or are too expensive, or are too difficult to manufacture, or are too difficult to assemble and to take apart, or hinder rotation of the plug.

SUMMARY OF THE INVENTION

A primary object of the invention is to provide a rotary plug valve of the general type described, which overcomes the objections to and deficiencies of the prior art valves, and which comprises parts that are simple and inexpensive to manufacture, which ensures easy turning of the plug with practical certainty of no leakage, and which is easy to assemble and disassemble.

Another object of the invention is to provide novel and improved packing or sealing means in the outer surface of the plug to contact with the wall of the plug chamber in encircling relation to the inlet port of the valve body when the valve is closed, said sealing means comprising a generally circular disk seated in a recess in the plug whose bottom wall is preferably segmentally cylindrical and coaxial with the plug and whose side wall is approximately cylindrical with its axis approximately perpendicular to the axis of said passage in the plug, said disk having a rear side to contact with and seat on said bottom wall of said recess and having at its edge a generally circular concentric rib of inherently resilient material such as rubber or "Teflon" with its rear side contacting the bottom wall of recess and its front side to contact the wall of said valve chamber in encircling relation to the inlet port when the valve is in closed position. With this construction, the sealing effect of the disk increases as the pressure of the fluid on the sealing disk increases so as to ensure against leakage of fluid even at high pressures.

The invention also contemplates a novel and improved arcuate stop element coactive with a knob on the valve plug and formed of wire with angularly bent end portions selectively insertable into recesses in the valve body to stop rotation of the plug selectively in different positions.

A BRIEF DESCRIPTION OF THE DRAWINGS

For a complete understanding of the invention, reference should be had to the following description in conjunction with the accompanying drawing in which:

FIG. 1 is a side elevational view of a two-way valve in its closed position;

FIG. 2 is a bottom plan view thereof, with portions broken away and shown in section;

FIG. 3 is a central vertical sectional view approximately on the axial plane of the line 3—3 of FIG. 2;

FIG. 4 is a top plan view of the valve in open position with portions of the knob broken away to show the plug stop;

FIG. 5 is a top plan view with the knob and the arcuate stop element removed;

FIG. 6 is a top plan view of the arcuate stop element;

FIG. 7 is a side elevation of the stop element;

FIG. 8 is a horizontal sectional view showing the invention in a three-way valve;

FIG. 9 is a front elevation of one form of the sealing disk;

FIG. 10 is a transverse sectional view of the disk;

FIG. 11 is a transverse sectional view of the disk in bent condition to conform to recess in the plug and to the wall of the valve chamber.

FIG. 12 is an enlarged view similar to FIG. 11 showing another form of sealing disk.

DESCRIPTION OF THE PREFERRED EMBODIMENTS

Specifically describing the invention, FIGS. 1 through 7, 9, 10 and 11 illustrate the invention embodied in a two-way valve while FIG. 8 shows a three-way valve having the sealing means of the invention embodied therein.

The valve includes a body or housing generally designated by the reference character A which has a valve chamber therein including an opening 1 extending through the body and from which radially extend aligned flow ports 2 and 3 which may be respectively an inlet port and an outlet port and may have screw threaded portions or be formed in some manner for connection of the valve in a pipe line. At one end of the opening is an inwardly extending perimetral flange 4.

The inner surface or wall of the valve chamber opening 1 is preferably cylindrical and a cylindrical valve plug B which may be either plastic such as Teflon or metal, is frictionally rotatably mounted in said valve chamber with one end provided with a shoulder 5 abutting the underside of said inwardly projecting flange 4.

The end portion of the plug adjacent to flange 4 projects outwardly from the chamber opening 1 and has connected thereto a knob for rotating the plug. The knob is separably attached to the plug and the plug is held in contact with the flange by a headed screw 6 which extends loosely through an opening 7 in the knob and is screw threaded at 8 in the plug. With this construction, when the plug and knob are disconnected from each other, the plug may be pushed into the opening 1 from the end thereof opposite the flange 4 and into contact with said flange, after which the knob can be applied to the projecting portion 9 of the plug.

The plug has a transverse flow passage 10 to move into and out of alignment with the flow ports 2 and 3 for opening and closing the valve, respectively. The valve is shown in closed position in FIGS. 2 and 3 with the ends of the passage 10 closed by the wall of the chamber opening 1, and upon rotation of the plug through an angle of 90°, the flow passage 10 brought into alignment with the ports 2 and 3 to open the valve.

It is desirable to provide packing or sealing means such as O-rings 11 and 12 between the plug and the wall of the valve chamber opening 1 at opposite sides of the transverse flow passage 10.

To provide additional protection against the possibility of leakage from the valve when the plug is in its closed position means is provided in the plug to seal the inlet port 2 and 2a as shown in FIGS. 3 and 8, respectively. The plug has a generally circular recess 13 whose bottom wall 14 preferably is segmentally cylindrical and coaxial with the plug and whose side wall is approximately cylindrical with its axis approximately perpendicular to the axis of the plug. Seated in said recess is a generally circular disk 15 one form of which is made of preferably cold flowing synthetic plastic material such as "Teflon" whose rear side 16 contacts and approximately conforms to the bottom wall of the recess. The disk has on its front side a generally circular concentric rib 17 of such height and diameter as to contact the wall of the valve chamber opening 1 in encircling relation to the inlet port when the valve is in closed position. The edge of the disk is approximately frusto-conical with the larger dimension at the rear side of the disk. The height of the rib 17 is greater than the height of the side wall of the recess 13 so the rib slidably frictionally engages the wall of the valve chamber opening 1, and the disk and rib have limited inherent compressibility to maintain sealing contact between the rib and the wall of the opening and the walls of the recess.

The sealing disk is inexpensive and is easy to manufacture. The disks can be made on a screw machine, and preferably the disk is bent along a diametral line for example as shown in FIG. 11, before it is inserted into the recess 13 so the disk will conform to the bottom wall of the recess as shown in FIG. 8. The disk is compressed as the plug is assembled into the valve chamber opening 1 to ensure a sealing contact between the rib 17 and the wall of the opening 1. By utilizing disks of different area and thickness, the amount of pressure of the disk on the wall of the opening 1 can be varied as required by plugs of different sizes or by high pressure or low pressure fluids. In all cases easy turning of the plug and a minimum of possibility of leakage are practically ensured.

FIG. 12 shows another form of the sealing disk generally denoted 15a. This disk comprises a central portion 15b in the form of a resilient metal disk, preferably brass, which has on its edge a generally circular rib or bead 15c of inherently resilient material which is mated to and molded on the metal disk, for example, graphited rubber or "Teflon".

The rear side of the rib 15c is adapted to sealingly contact the bottom wall of the recess 13 in the plug while the front side of the rib contacts the wall of the valve chamber in encircling relation to the inlet port when the valve is in closed position. When the disk is installed the rib 15c also is pressed into sealing contact with the side wall of the recess 13.

The knob C is shown in the valve closing position in FIGS. 1, 2 and 3, and in the valve opening position in FIG. 4, and means is included for stopping rotation of the plug by the knob in any of a plurality of different positions. This means includes an arcuate stop element 20 formed of wire and having its end portions 21 and 22 disposed perpendicularly to the general plane of the element in the nature of fingers. The stop element is settable in different positions by inserting the fingers into selected ones of a plurality of recesses 23 arranged in a circular row concentric with the plug in the upper end of the valve body, so that the fingers will coact with a stop lug 24 disposed in a circular groove 25 in the bottom side of the knob in which groove said stop element is located so the lug will contact the fingers 21 and 22 for limiting rotation of the plug. The distance between the fingers is generally sufficient to permit rotation of the plug from full-open to full-closed position, and by setting the stop element with its fingers in different recesses 23, the rotation of the plug can be stopped in different positions with respect to the flow ports 2 and 3.

While the valve shown in FIGS. 1 through 5 is a two-way valve, the invention may be embodied in other multi-way valves, e.g., in a three-way valve as shown in FIG. 8 in which case the valve body D is formed with three angularly related flow ports 2a, 3a. The plug E is formed with one diametrical flow passage 27 communicating with an angularly related flow passage 28. With this construction, when plug E has been turned to have the flow passage 27 in communication with ports 2a and 3a, plug E has sealing disk 13 in closing relation to port 25. When plug E is turned and has sealing disk in closing relation to port 2a as shown, the port 3a exhausts into port 7a.

I claim:

1. A rotary plug valve comprising:

a valve body having a cylindrical opening therethrough providing a valve chamber from which extend radially aligned flow ports;

a cylindrical plug rotatably disposed in said opening and having a transverse passage therethrough movable selectively into and out of register with said flow ports upon rotation of said plug into open and closed positions respectively, and sealing means to encircle one of said flow ports in sealing contact with the wall of said opening when the plug is in closed position, including a generally circular recess in the cylindrical face of said plug having a bottom wall and a side wall of greater diameter than said one flow port, and a disk having a generally circular rib at its edge which has inherent resiliency seated in said recess with the rear side of said disk and its edge in sealing contact with the bottom wall and side wall of said recess respectively and with the front side of said rib to encircle said one flow port in sealing contact with the wall of said opening in valve body;

and further comprising:

a knob mounted on the end of said plug outwardly of the valve body and having circular groove in its bottom side, and wherein said body has a circular row of spaced recesses concentric with and beneath said knob, there is an arcuate wire stop element having a finger perpendicular to the general plane of said stop element at each end thereof selectively removably insertable in said recesses, and there is a stop lug in said circular groove of the knob between and to coact with said fingers of said arcuate wire stop element, providing for stopping rotation of said plug selectively in any one of a plurality of different positions.

2. A rotary plug valve as defined in claim 1 wherein the bottom wall of said recess is segmentally cylindrical and the rear side of said disk conforms to said bottom wall of the recess.

3. A rotary plug valve as defined in claim 1 wherein the bottom wall of said recess is segmentally cylindrical and the rear side of said disk conforms to said bottom wall of the recess, the side wall of said recess is generally cylindrical and the edge of said disk is approximately frusto-conical with the larger dimension at the rear side of the disk.

4. A rotary plug valve as defined in claim 1 wherein said disk is composed of a cold-flowing synthetic plastic material.

5. A rotary plug valve as defined in claim 4 wherein said disk is formed of "Teflon".

6. A rotary plug valve as defined in claim 1 wherein said disk has a resilient metal central portion and said rib is formed of inherently resilient material mated to and molded on the edge of said metal disk.

7. A rotary plug valve as defined in claim 6 wherein said rib is formed of graphited rubber.

8. A rotary plug valve as defined in claim 1 wherein the bottom wall of said recess is segmentally cylindrical and the rear side of said disk conforms to said bottom wall of the recess.

9. A rotary plug valve comprising:
 a valve body having a cylindrical opening therethrough providing a valve chamber from which extend radially aligned flow ports;
 a cylindrical plug rotatably disposed in said opening and having a transverse passage therethrough movable selectively into and out of register with said flow ports upon rotation of said plug into open and closed positions respectively;
 sealing means to encircle one of said flow ports in sealing contact with the wall of said opening when the plug is in closed position, including a generally circular recess in the cylindrical face of said plug having a bottom wall and a side wall of greater diameter than said one flow port, and a disk having a generally circular rib at its edge which has inherent resilience seated in said recess with the rear side of said disk and its edge in sealing contact with the bottom wall and side wall of said recess respectively and with the front side of said rib to encircle said one flow port in sealing contact with the wall of said opening in valve body;
 and wherein:
 the bottom wall of said recess is segmentally cylindrical and the rear side of said disk conforms to said bottom wall of the recess, the side wall of said recess is generally cylindrical and the edge of said disk is approximately frustoconical with the larger dimension at the rear side of the disk.

10. A rotary plug valve as defined in claim 9 with the addition of a knob mounted on the end of said plug outwardly of the valve body and having circular groove in its bottom side, and wherein said body has a circular row of spaced recesses concentric with and beneath said knob, there is an arcuate wire stop element having a finger perpendicular to the general plane of said stop element at each end thereof selectively removably insertable in said recesses, and there is a stop lug in said circular groove of the knob between and to coact with said fingers of said arcuate wire stop element, providing for stopping rotation of said plug selectively in any one of a plurality of different positions.

11. A rotary plug valve as defined in claim 9 wherein said disk is composed of a cold-flowing synthetic plastic material.

12. A rotary plug valve as defined in claim 11 wherein said disk is formed of "Teflon".

13. A rotary plug valve as defined in claim 9 wherein said disk has a resilient metal central portion and said rib is formed of inherently resilient material mated to and molded on the edge of said metal disk.

14. A rotary plug valve as defined in claim 13 wherein said rib is formed of graphited rubber.

* * * * *